April 8, 1924.  1,489,333

J. PFEIFER

PERMUTATION LOCKING MECHANISM

Original Filed May 5, 1919   2 Sheets-Sheet 1

Inventor
John Pfeifer
By Staley & Bowman
Attorneys

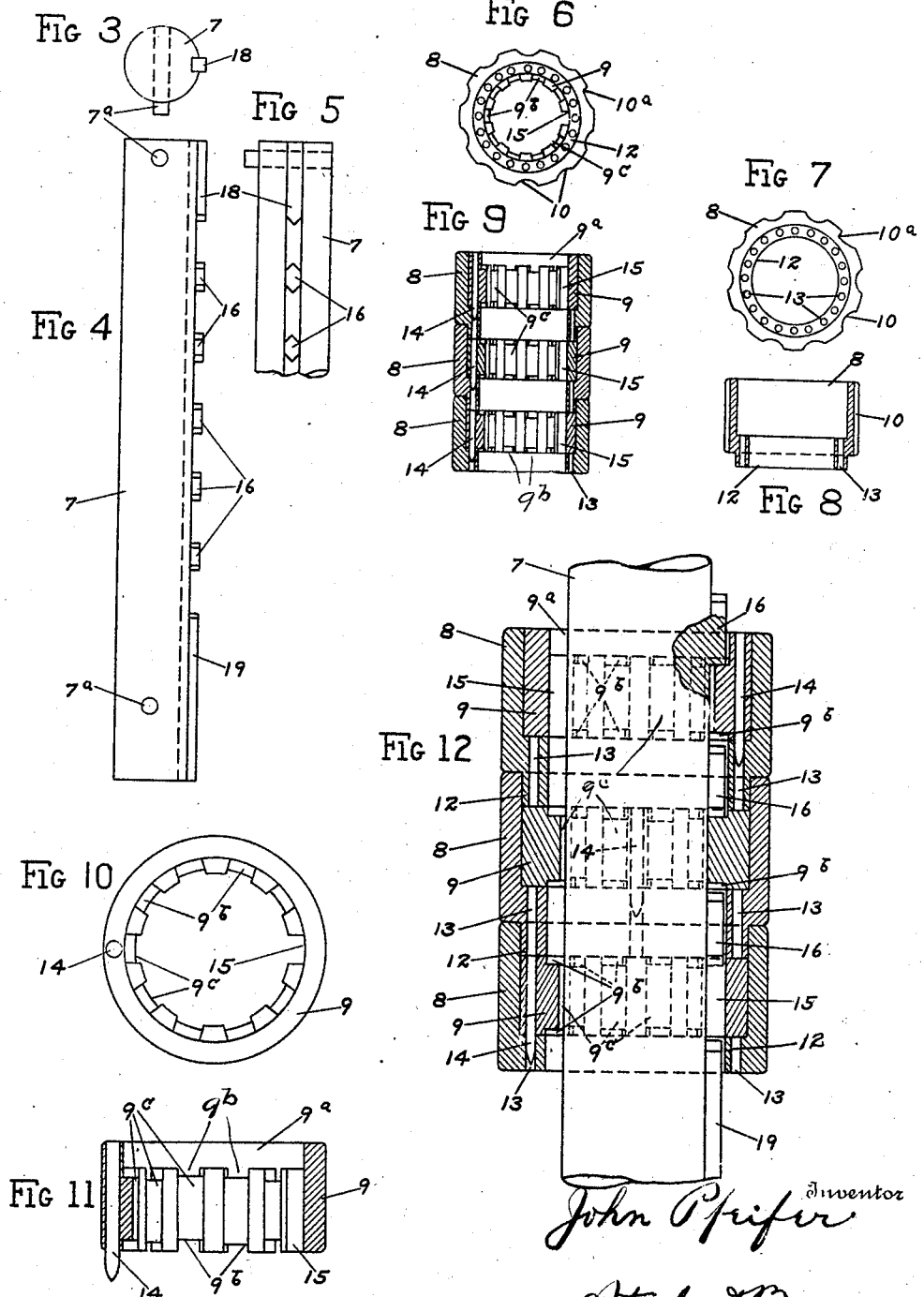

Patented Apr. 8, 1924.

1,489,333

UNITED STATES PATENT OFFICE.

JOHN PFEIFER, OF SPRINGFIELD, OHIO, ASSIGNOR TO THE SPRINGFIELD AUTO LOCK COMPANY, OF SPRINGFIELD, OHIO, A CORPORATION OF OHIO.

PERMUTATION LOCKING MECHANISM.

Original application filed May 5, 1919, Serial No. 294,809. Divided and this application filed July 21, 1920. Serial No. 397,938.

*To all whom it may concern:*

Be it known that I, JOHN PFEIFER, a citizen of the United States, residing at Springfield, in the county of Clark and State of Ohio, have invented certain new and useful Improvements in Permutation Locking Mechanisms, of which the following is a specification.

This invention relates to permutation locking mechanism, it more particularly relating to a mechanism of the kind referred to which may be combined with a suitable support for the purpose of locking the steering wheel of an automobile; this application being a division of my pending application Ser. No. 294,809 filed May 5th, 1919.

The object of the invention is to provide a locking mechanism for the purpose referred to which will be simple and compact in construction and effective in operation.

A further and more specific object is to provide an arrangement whereby the mechanism may be readily set to and stopped at zero and as readily set to the unlocking position of the parts without the necessity of visual inspection upon the part of the operator.

A further object of my invention is to provide means to prevent the unlocking of the mechanism without employment of the proper combination required for that purpose.

Further objects of the invention will appear from the accompanying description and drawings.

In the accompanying drawings:—

Fig. 3 is an end view of the locking bolt.

Fig. 4 is a side view of the bolt.

Fig. 5 is a view of the rear side of a portion of the bolt.

Fig. 6 is a top plan view of one of the members of the locking mechanism.

Fig. 7 is a top plan view of a portion of the same member with the inner locking ring removed.

Fig. 8 is a vertical section of the part shown in Fig. 7.

Fig. 9 is a vertical section of several elements of the locking mechanism showing the parts in unlocked position.

Fig. 10 is a top plan view of one of the inner locking means.

Fig. 11 is a vertical section of the same.

Fig. 12 is an enlarged sectional view of the locking sleeves and rings with the locking bolt in position therein, the upper and intermediate sleeves and rings being shown in their locking positions and the lower sleeve and its ring in unlocking position.

Figure 2:
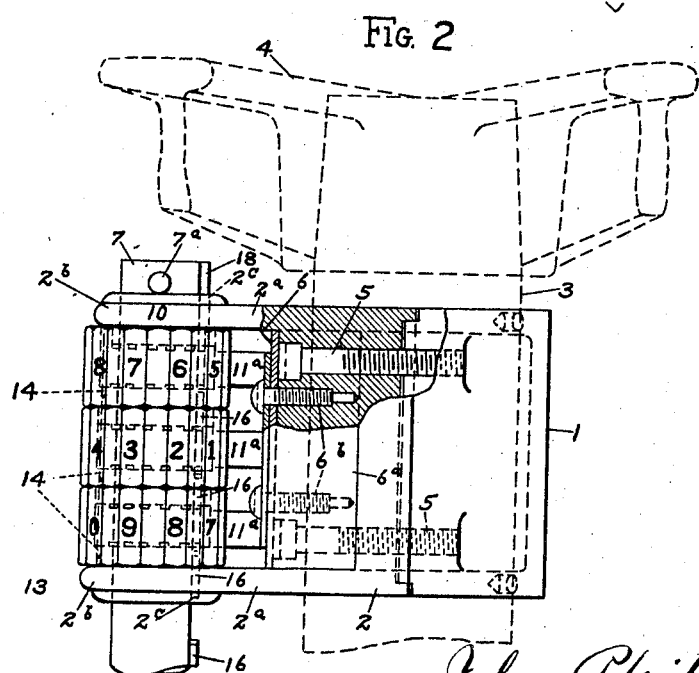
Fig. 2 is a side view of the same partly broken away and shown in section.

Referring to the drawings, 1 and 2 represent two members of a clamp, semi-cylindrical in shape so as to conform to the contour of the steering post 3 (shown in dotted lines) of the steering wheel 4 of a motor vehicle; the meeting edges of the two clamping members being shouldered as indicated in Fig. 2 so as to overlap to form a protecting wall for the securing devices for the same, to be described. The member 2 has forwardly-extending top and bottom flanges 2$^a$ formed integrally therewith and these top and bottom flanges have centrally arranged integrally formed apertured ears 2$^b$.

Extending through the walls of the clamping member 2 into the clamping member 1 are screws 5 which secure the two members of the clamp firmly together about the post. Placed over the front edges of the walls of the member 2 is a cover plate 6, this cover plate being of a U-form so as to provide sides 6$^a$, which fit against the sides of the walls of the clamping member 2 which are recessed for the purpose of receiving these sides 6$^a$. Screws 6$^b$ extending through the cover 6 into the walls of the member 2 hold the cover in position, but other means are also provided for preventing the removal of this cover and obtaining access to the screws 5 which will be hereinafter explained in connection with the permutation locking mechanism.

A locking bolt 7 is slidably mounted in the apertured ears 2$^b$. About this bolt and between the ears are locking devices for the same. These locking devices consist of a series of outer sleeves 8, three in number in the present case, each provided with an inner ring 9. Each sleeve 8 is provided with equally spaced indications from 0 to 9 as shown and between each indication is a vertical groove 10, these rounded grooves co-operating with spring fingers 11ᵃ on a plate 11 which is held in position on the cover 6 by the screws 6ᵇ previously referred to; the spring fingers 11ᵃ having their outer ends bent at a slight angle so as to wipe over the respective sleeves 8 and co-operate with the grooves to act as clickers. One of the grooves 10 is provided with a straight face at one side thereof as indicated at 10ᵃ in Figs. 6 and 7 so as to co-operate with the extreme ends of the clicker arms and act as stops for the sleeves so that the sleeves may be turned back and stopped at zero for the purpose of finding the combination by observing the number of clicks.

Each sleeve 8 has an integrally-formed inner flange 12 at its lower end provided with a series of equally spaced vertical openings 13, in the present case twenty of these openings being provided. In the two upper sleeves this flange projects below the lower edge thereof, as shown in Figs. 8, 9 and 12, so as to telescope with the under sleeve. Each of the rings 9 is fitted to the interior of its corresponding sleeve 8, resting upon the flange 12. In the upper sleeve 8 this ring may be of a length equal to the distance between the upper end of the sleeve 8 and its flange 12, but in the intermediate and lower sleeves the ring is shorter so as to accommodate the flange of the sleeve immediately above it. Each ring 9 has a downwardly-extending pin 14 so positioned that when the ring is inserted in its sleeve the pin will be caused to enter any one of the openings 13 so as to hold the ring in fixed relation with the sleeve so far as revoluble movement is concerned. Each ring 9 also has diametrically opposite the pin, a vertically-extending interior slot 15. The extreme upper portion of the upper ring is formed with an enlarged bore as indicated at 9ᵃ so that the upper edge thereof may stand flush with the upper edge of its sleeve 8 so that when the sleeves and rings are in assembled position between the ears 2ᵇ, they will be held against any vertical displacement; this construction leaving the grooved portion of said upper ring of the same size as that of the two other rings for a purpose to be explained.

The locking bolt 7 is provided with a series of aligned projections 16, in the present case 5 in number, and also at the upper and lower ends with ribs 18 and 19 in alignment with the projections, the ends of the projections and ribs being beveled as shown. Each of the ears 2ᵇ has a vertical slot 2ᶜ cut in the inner bore of the aperture therethrough, these grooves being aligned and in the present case being centered on the transverse axes of the apertures. The distance between the respective ribs and the adjacent projections and also between the projections is equal to or slightly greater than the width of the intermediate and lower rings and of the grooved portion of the upper ring. When the parts are in assembled position and the grooves 15 are in alignment with each other, as shown in Fig. 9, and also with the ribs and projections on the bolt, the bolt may be moved vertically to or from locking position; the bolt being extended between two of the spokes of the steering wheel to lock the same. To lock the bolt the sleeves 8 are turned to bring the solid portions of the rings in alignment with the projections on the bolt and to unlock the bolt it is then necessary to turn the sleeves back to the proper point to again align the grooves in the rings with each other and with the projections and ribs, the point to which these sleeves are turned being determined by the combination. It should be explained that the bolt 7 is provided at each end with a stop 7ᵃ, one or both of which may be removable and that when the bolt is at its extreme upper or lower position as determined by these stops, the intermediate and lower rings and the grooved portion of the upper ring will be in alignment with the spaces between the projections and ribs of the bolt so that the sleeves and their rings may be turned about the bolt for the purpose of locking or unlocking the same. In addition to the groove 15 in each of the rings, these rings are also provided with a series of equally spaced shallow recesses 9ᵇ on both their upper and lower edges, nine in number, which, with the grooves 15 correspond to the indications on the sleeves 8. These notches or recesses 9ᵇ are for the purpose of "foolers" to prevent the finding of the groove 15 by the slight up and down movement allowed by the bolt when in locked position. In order that the notches may be more effective for the purpose, they are made of varying depths as shown more clearly in Fig. 11, so that it will be impossible by delicate touch to determine when the groove 15 has been brought to the required unlocking position. In order to further provide for preventing the unlocking of the mechanism without the proper combination, there is formed in the interior wall of each ring member 9, in line with the respective notches 9ᵇ, a series of shallow grooves 9ᶜ, these grooves extending from the lower notches to the upper notches and being preferably about one-third the depth of the groove 15. By the employment of these shallow grooves, it will be impossible to detect the location of the deep groove 15 by any imperfection on the surface of the locking bolt.

In order to set the combination, assuming that the combination is 9 5 1, the pin on the upper ring will have been placed in the opening 13 opposite the indication 9 of its sleeve, the pin on the intermediate ring will have been placed in the opening 13 opposite the indication 5 of its sleeve, and the pin on the lower ring will have been placed in the opening opposite the indication 1 of its sleeve. By then turning all the sleeves so as to read 9 5 1 downwardly, all the grooves 15 will be aligned with each other and also with the projections and ribs on the bolt, thus unlocking the bolt. The combination can be changed at any time by removing the sleeves and changing the position of the rings with respect thereto. If desired the pins of the rings may be placed in an opening intermediate any two indications on the sleeves so that half numbers may be secured in the combination, and that is the reason why twenty of the openings 13 are provided.

By the arrangement shown, it will be seen that it will be impossible to remove the sealing plate 6 to obtain access to the clamping screws 5 because of the location of the locking mechanism in close proximity thereto and because of the U-shaped form of the plate, as in order to remove the plate the sides 6ª thereof must clear the walls of the clamping member 2.

Figure 1:
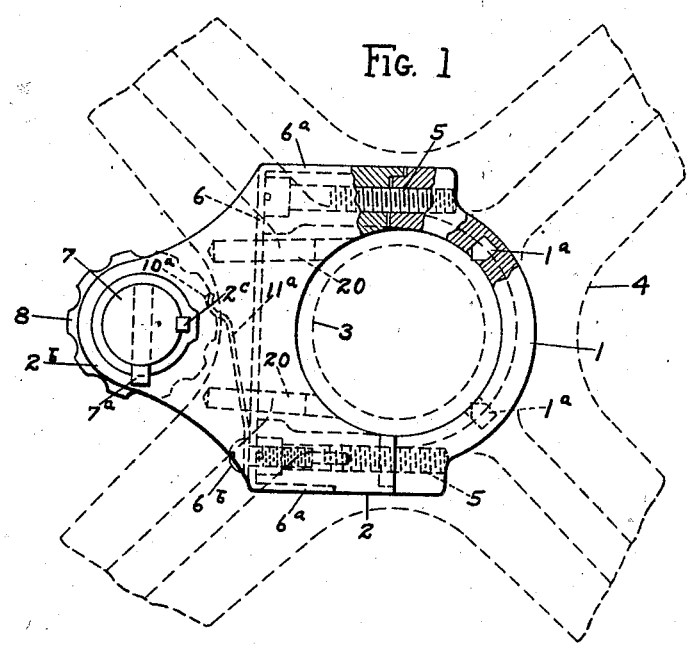
Fig. 1 is a top plan view of a portion of the steering wheel of an automobile, showing my improved locking mechanism, together with the support applied thereto.

In Figs. 1 and 2, the clamping member 1 is shown provided with inserted pointed pins 1ª, the pointed ends of which project slightly on the interior thereof so as to impinge or dig into the steering post and prevent the clamp being hammered down on the post to an extent to unlock the wheel. In Fig. 1, there is also shown in dotted lines two hardened pins 20 which are inserted into each of the ears 2ᵇ to prevent the ears from being sawed off. It might also be stated that the bolt is of hardened steel as is also the sealing plate 6.

By the construction described it will be seen that a permutation locking mechanism is provided which may be readily removed from its supports for the purpose indicated, also a mechanism which may be readily unlocked by the operator without the necessity of visually inspecting the indications on the rotatable sleeves which enables the steering wheel to be readily unlocked at night, and also a mechanism in which the unlocking thereof would be extremely difficult without the proper combination.

Having thus described my invention, I claim:—

In a lock, the combination, with aligned members, of a bolt, a series of aligned projections on said bolt, a series of sleeves about said bolt, each sleeve having an inner notched ring rotatable therewith, each sleeve being also provided with a series of exteriorly arranged concaved notches, one of said notches having a straight side, and a series of spring clicker fingers co-operating with said concaved notches, the straight sided groove of each sleeve co-operating with its corresponding clicker finger to form a stop for said sleeve, for the purpose specified.

In testimony whereof, I have hereunto set my hand this 16th day of July, 1920.

JOHN PFEIFER.

Witness:
CHAS. I. WELCH.